(12) United States Patent
Obayashi

(10) Patent No.: US 10,510,135 B2
(45) Date of Patent: Dec. 17, 2019

(54) IMAGE PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Yosuke Obayashi, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 15/403,488

(22) Filed: Jan. 11, 2017

(65) Prior Publication Data

US 2017/0206629 A1 Jul. 20, 2017

(30) Foreign Application Priority Data

Jan. 18, 2016 (JP) .................................. 2016-007226

(51) Int. Cl.
*G06T 1/60* (2006.01)
*G06F 12/02* (2006.01)
*G06F 12/06* (2006.01)
*G06F 13/16* (2006.01)

(52) U.S. Cl.
CPC ............ *G06T 1/60* (2013.01); *G06F 12/0207* (2013.01); *G06F 12/0615* (2013.01); *G06F 13/16* (2013.01); *G06F 2212/1024* (2013.01); *G06F 2212/1044* (2013.01)

(58) Field of Classification Search
None
See application file for complete search history.

(56) References Cited

U.S. PATENT DOCUMENTS

| 5,359,694 | A  | * | 10/1994 | Concordel | ........... H04N 1/0402 358/435 |
| 5,973,707 | A  | * | 10/1999 | Mita | ................... H04N 1/32358 345/561 |
| 7,379,609 | B2 | * | 5/2008  | Park | ................... H04N 1/32358 345/574 |
| 8,466,928 | B2 | * | 6/2013  | Ogura | ....................... G06T 1/60 345/531 |
| 2006/0098012 | A1 | * | 5/2006 | Park | ....................... H04N 19/42 345/441 |

FOREIGN PATENT DOCUMENTS

JP        2008-112435 A    5/2008

* cited by examiner

*Primary Examiner* — Yingchun He
(74) *Attorney, Agent, or Firm* — Venable LLP

(57) ABSTRACT

The present image processing apparatus mutually converts raster-order image data and block-order image data by dividing image data into a plurality of areas in units of bands, and performing reading-out and writing of the image data to one line memory in the units of bands of the division. The apparatus calculates, in the units of bands, an address increased amount, which is used for calculating an address to next write to or read out from, from an address that is a current processing target, calculates an address of a write destination when writing image data to the line memory and an address of a readout destination when reading-out image data from the line memory by adding the calculated address increased amount to an address value of a current processing target address.

12 Claims, 15 Drawing Sheets

FIG. 5

PATTERN 0 (510), address increased amount = 1, labels 502, 503, 501, 307:

| 0 _0_ | 1 _1_ | 2 _2_ | 3 _3_ | 4 _4_ | 5 _5_ | 6 _6_ |
|---|---|---|---|---|---|---|
| 7 _7_ | 8 _8_ | 9 _9_ | 10 _10_ | 11 _11_ | 12 _12_ | 13 _13_ |
| 14 _14_ | 15 _15_ | 16 _16_ | 17 _17_ | 18 _18_ | 19 _19_ | 20 _20_ |

PATTERN 1 (520), address increased amount = 7:

| 0 _0_ | 1 _3_ | 2 _6_ | 3 _9_ | 4 _12_ | 5 _15_ | 6 _18_ |
|---|---|---|---|---|---|---|
| 7 _1_ | 8 _4_ | 9 _7_ | 10 _10_ | 11 _13_ | 12 _16_ | 13 _19_ |
| 14 _2_ | 15 _5_ | 16 _8_ | 17 _11_ | 18 _14_ | 19 _17_ | 20 _20_ |

PATTERN 2 (530), address increased amount = 9:

| 0 _0_ | 1 _9_ | 2 _18_ | 3 _7_ | 4 _16_ | 5 _5_ | 6 _14_ |
|---|---|---|---|---|---|---|
| 7 _3_ | 8 _12_ | 9 _1_ | 10 _10_ | 11 _19_ | 12 _8_ | 13 _17_ |
| 14 _6_ | 15 _15_ | 16 _4_ | 17 _13_ | 18 _2_ | 19 _11_ | 20 _20_ |

PATTERN 3 (540), address increased amount = 3:

| 0 _0_ | 1 _7_ | 2 _14_ | 3 _1_ | 4 _8_ | 5 _15_ | 6 _2_ |
|---|---|---|---|---|---|---|
| 7 _9_ | 8 _16_ | 9 _3_ | 10 _10_ | 11 _17_ | 12 _4_ | 13 _11_ |
| 14 _18_ | 15 _5_ | 16 _12_ | 17 _19_ | 18 _6_ | 19 _13_ | 20 _20_ |

FIG. 11

ADDRESS INCREASED AMOUNT = 2

| 0 0 | 1 1 | 2 2 | 3 3 | 4 4 | 5 5 |
|---|---|---|---|---|---|
| 6 6 | 7 7 | 8 8 | 9 9 | 10 10 | 11 11 |

PATTERN 0 — 1110

ADDRESS INCREASED AMOUNT = 6

| 0 0 | 1 1 | 2 4 | 3 5 | 4 8 | 5 9 |
|---|---|---|---|---|---|
| 6 2 | 7 3 | 8 6 | 9 7 | 10 10 | 11 11 |

PATTERN 1 — 1120

ADDRESS INCREASED AMOUNT = 8

| 0 0 | 1 1 | 2 8 | 3 9 | 4 6 | 5 7 |
|---|---|---|---|---|---|
| 6 4 | 7 5 | 8 2 | 9 3 | 10 10 | 11 11 |

PATTERN 2 — 1130

ADDRESS INCREASED AMOUNT = 4

| 0 0 | 1 1 | 2 6 | 3 7 | 4 2 | 5 3 |
|---|---|---|---|---|---|
| 7 8 | 8 9 | 9 4 | 10 5 | 11 10 | 12 11 |

PATTERN 3 — 1140

IMAGE PROCESSING APPARATUS, METHOD OF CONTROLLING THE SAME, AND STORAGE MEDIUM

BACKGROUND OF THE INVENTION

Field of the Invention

The present invention relates to an image processing apparatus for mutually converting a plurality of rectangular images and a raster image, a method of controlling same, and a storage medium.

Description of the Related Art

An image input unit such as for an image capturing apparatus of an image forming apparatus or an image output (forming) unit such as for an optical scanning apparatus typically handles image data in a raster scan order. In contrast, processing in units of rectangular images is performed in many digital image processes with respect to input data from an image input unit, for example filtering processing that uses a window, encoding processing for a JPEG method, a screening process for converting an input image that has been subjected to density tone representation into area coverage modulation, or the like. Below, processing in units of rectangular images is referred to as block processing, and an image order of a rectangular image unit handled in block processing is referred to as a block order.

To perform block processing with respect to an input image having a raster order, pre-processing for converting the image data of the input image into a block order becomes necessary. In this pre-processing, normally a line memory having a capacity of a rectangular area of the image width× the block height (the block area) is used. Below, an image unit of this line memory capacity amount is referred to as a band, and a line memory is also referred to as a band memory. If an image processing unit for performing block processing is configured by a pipeline, in each image processing unit, pre-processing for converting a raster order to a block order becomes necessary. Accordingly, line memory in proportion to the number of image processing units becomes necessary, and circuit scale increases. To suppress an increase of the line memory, it is necessary to convert a raster order into a block order in advance before inputting an image to the image processing unit. Because of this, configuration may be such that each image processing unit always handles an input image as a block order, and there ceases to be a need to use line memory in proportion to the number of image processing units. A block order image output from the image processing unit is converted again to the raster order for outputting to an image forming unit.

In the mutual conversion of the raster order and the block order that is necessary in pre-processing and post-processing of the image processing unit, a double-buffer scheme that uses two line memories having a capacity for a rectangular area obtained from the image width and the block height is widely known. In the double-buffer scheme, by reading out image data after an order conversion from one line memory, while image data for before the order conversion is being written to the other line memory, it becomes possible to perform conversion processing while also suppressing a decrease of throughput. However, in the double-buffer scheme, there is a problem in that a required line memory capacity is large, leading to an increase of a circuit scale. To solve this problem, a single-buffer scheme that enables a conversion even with a configuration in which there is only one line memory, by multiplexing writing of image data before the conversion and reading out of image data after the conversion, is known. Japanese Patent Laid-Open No. 2008-112435 discloses a method that realizes an address calculation in the single-buffer scheme.

However, there is a problem as is recited below in the foregoing conventional technique. In the single-buffer scheme, by sequentially performing writing of a next pixel to a line memory address for which reading out of a pixel has completed, it is possible to realize conversion processing in half a line memory capacity in comparison to the double-buffer scheme. However, in the single-buffer scheme, by multiplexing access for writing and reading out with respect to a line memory, there is the problem that an address calculation becomes complicated. Accordingly, in the above conventional technique, two address patterns are prepared for a single buffer, and writing and reading out are performed while switching the address patterns. However, in such a method, restrictions in an image width and a block size are introduced. For example, for an input image having a different size to an address pattern prepared in advance, if padding control for adding dummy pixels is not performed, it is not possible to use the address pattern. As a result, there is a problem in that an address calculation for an added dummy pixel is necessary, complicating control, and introducing a decrease in throughput.

SUMMARY OF THE INVENTION

The present invention enables realization of a mechanism for mutually converting a plurality of rectangular images and a raster image by a single-buffer scheme with simple control without causing throughput to decrease, and without using a LUT for an address pattern.

One aspect of the present invention provides an image processing apparatus for mutually converting raster-order image data and block-order image data by dividing image data into a plurality of areas in units of bands, and performing reading-out and writing of the image data in relation to one line memory in the units of bands of the division, the apparatus comprising: an address increased amount calculation unit configured to calculate, in the units of bands, an address increased amount from a current processing target address that is used for calculating an address next written to or read out from; an address calculation unit configured to calculate an address of a write destination for a time of writing image data to the line memory and an address of a readout destination for a time of reading out image data from the line memory, by adding an address increased amount calculated by the address increased amount calculation unit to an address value of the current processing target address; and an access unit configured to, in accordance with the address calculated by the address calculation unit, access the line memory and execute writing and reading out of image data.

Another aspect of the present invention provides a method of controlling an image processing apparatus for mutually converting raster-order image data and block-order image data by dividing image data into a plurality of areas in units of bands, and performing reading-out and writing of the image data in relation to one line memory in the units of bands of the division, the method comprising: an address increased amount calculation unit calculating, in the units of bands, an address increased amount from a current processing target address that is used for calculating an address next written to or read out from; an address calculation unit calculating an address of a write destination for a time of writing image data to the line memory and an address for a readout destination for a time of reading out image data from the line memory, by adding an address increased amount calculated by the address increased amount calculation unit to an address value of the current processing target address; and an access unit accessing, in accordance with the address calculated by the address calculation unit, the line memory and executing reading out and writing of image data.

Still another aspect of the present invention provides a non-transitory computer-readable storage medium storing a computer program for causing a computer to execute a method of controlling an image processing apparatus for mutually converting raster-order image data and block-order image data by dividing image data into a plurality of areas in units of bands, and performing reading-out and writing of the image data to one line memory in the units of bands of the division was performed, the method comprising: an address increased amount calculation unit calculating, in the units of bands, an address increased amount from a current processing target address that is used for calculating an address next written to or read out from; an address calculation unit calculating an address of a write destination for a time of writing image data to the line memory and an address for a readout destination for a time of reading out image data from the line memory, by adding an address increased amount calculated by the address increased amount calculation unit to an address value of the current processing target address; and an access unit accessing, in accordance with the address calculated by the address calculation unit, the line memory and executing reading out and writing of image data.

Further features of the present invention will be apparent from the following description of exemplary embodiments with reference to the attached drawings.

BRIEF DESCRIPTION OF THE DRAWINGS

FIG. 5 is a view illustrating an example of an order of access to a line memory according to an embodiment.

FIG. 11 is a view illustrating an example of an order of access to a line memory according to an embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Image Processing Apparatus Configuration>

Figure 1A:
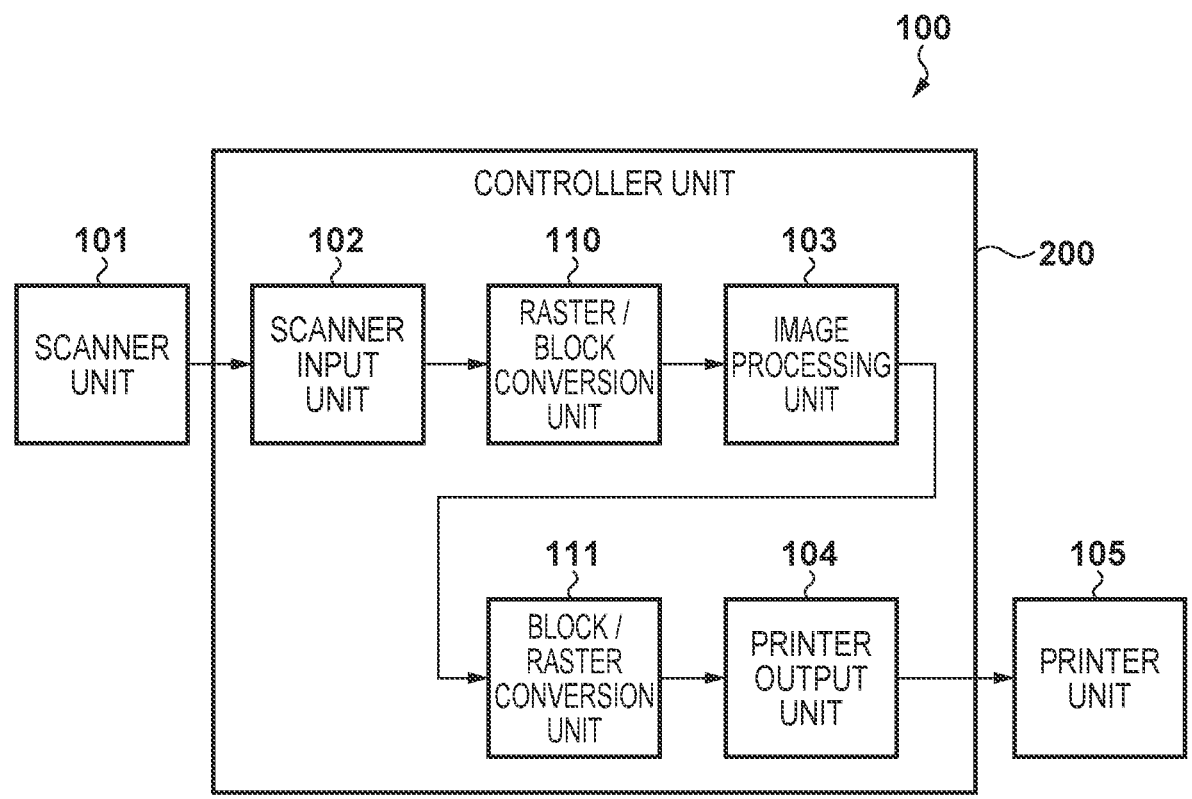
FIG. 1A is a view for illustrating a control configuration of an image processing apparatus according to an embodiment.
Figure 1B:
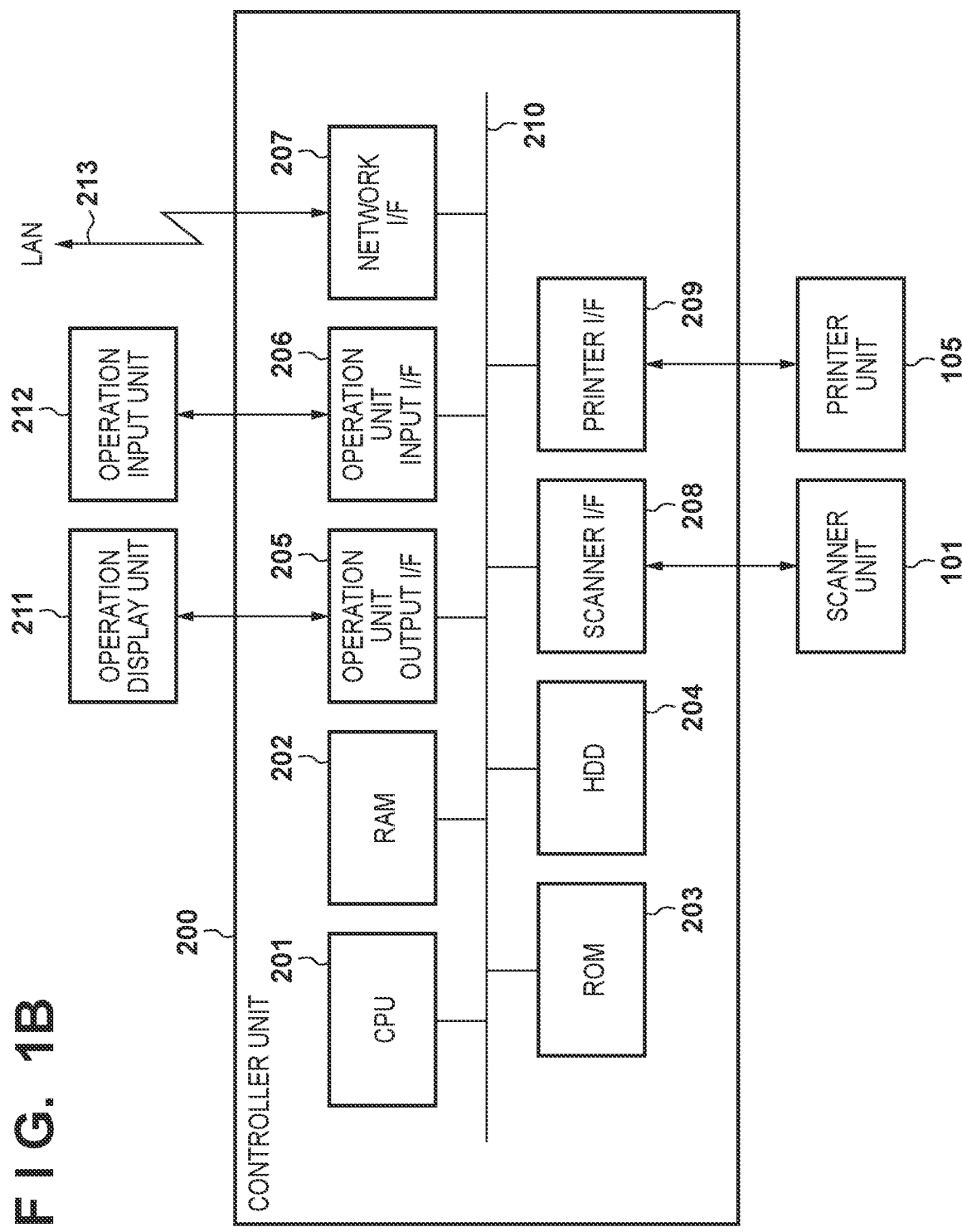
FIG. 1B is a view for illustrating a hardware configuration of an image processing apparatus according to an embodiment.

Below, description will be given for a first embodiment of the present invention. With reference to FIG. 1A and FIG. 1B, description is given regarding a configuration of an image processing apparatus 100 according to the present embodiment. As illustrated in FIG. 1A, the image processing apparatus 100 is provided with a controller unit 200, a scanner unit 101, and a printer unit 105.

As illustrated in FIG. 1B, the controller unit 200 has a CPU (Central Processing Unit) 201 for executing various control programs. The CPU 201 activates the system based on the boot program stored in a ROM (Read Only Memory) 203. It reads out a control program stored in a HDD (hard disk apparatus) 204 in this system, and executes predetermined processing with a RAM (Random Access Memory) 202 as a work area.

Various control programs are stored in the HDD 204. In addition, the HDD 204 stores data obtained from outside the apparatus via a network I/F 207 or scan data read from the scanner unit 101. An operation unit output I/F 205 performs data output communication control to an operation display unit 211.

An operation unit input I/F 206 performs data input communication control to an operation input unit 212. The network I/F 207 is connected to a LAN 213, and performs input/output control of information via the LAN 213. A scanner I/F 208 inputs image data from the scanner unit 101, and also performs input and output of scanner control data. A printer I/F 209 outputs output image data to the printer unit 105, and also performs input and output of printer control data. Each of the devices 201 through 209 described above are arranged on a system bus 210.

The operation input unit 212 is an instruction input interface, provided in an input apparatus such as a touch panel or a hard key, for receiving an instruction from a user. The operation display unit 211 is a display interface, to a user, that is provided with a display apparatus such as an LCD (Liquid Crystal Display) or an LED (Light Emitting Diode).

The scanner unit 101 is provided with an optical image reading apparatus such as a CCD (Charge Coupled Device), and has a function of optically operating on paper media to read it as electronic image data. The printer unit 105 has a function of forming electronic image data as an image on a recording medium such as a sheet.

The controller unit 200, as a control configuration, is provided with a scanner input unit 102, a raster/block conversion unit 110, an image processing unit 103, a block/raster conversion unit 111, and a printer output unit 104. The scanner input unit 102 accepts a raster image from the scanner unit 101 which is connected externally. The scanner unit 101 uses an image sensor (not shown) to read original data. Image data read by the scanner unit 101 is sequentially transferred to the scanner input unit 102 in pixel units in a raster order. The scanner input unit 102 receives pixel data transferred from the scanner unit 101 in accordance with a video synchronization signal (not shown), and transmits image data received from the raster/block conversion unit 110 through an internal buffer (not shown).

The raster/block conversion unit 110 converts raster-order image data into block-order image data. The block/raster conversion unit 111 converts block-order image data into raster-order image data. Note that, for convenience, description is given here of the raster/block conversion unit 110 and the block/raster conversion unit 111 separately, but in the present embodiment it is desirable for them to be realized as the same configuration. This is because it is possible to further reduce the size of the line memory. In addition, for convenience below, a case of converting a raster order into a block order is abbreviated as a raster/block conversion, and a case of converting a block order into a raster order is abbreviated as a block/raster conversion.

The raster/block conversion unit 110 transmits raster-order image data received from the scanner input unit 102 to the image processing unit 103 sequentially in pixel units of a block order. The image processing unit 103 performs block processing. The image processing unit 103 performs filtering processing, a screening process, or the like on block-order image data received from the raster/block conversion unit 110, and transmits the image data after the processing to the block/raster conversion unit 111 as block-order image data. The block/raster conversion unit 111, after converting the block-order image data received from the image processing unit 103 into raster-order image data, outputs to the printer output unit 104.

The printer output unit 104 transmits image data received in a raster order to the printer unit 105 via an internal buffer (not shown). The printer unit 105 is connected to the exterior of the image processing apparatus 100, and performs exposure and image forming by receiving the raster-order image data from the printer output unit 104 in accordance with a video synchronization signal (not shown), and irradiating a laser beam (not shown) onto a photosensitive drum. In scanning control when performing the exposure, the raster-order image data is used.

<Raster Order and Block Order>

Figure 2:
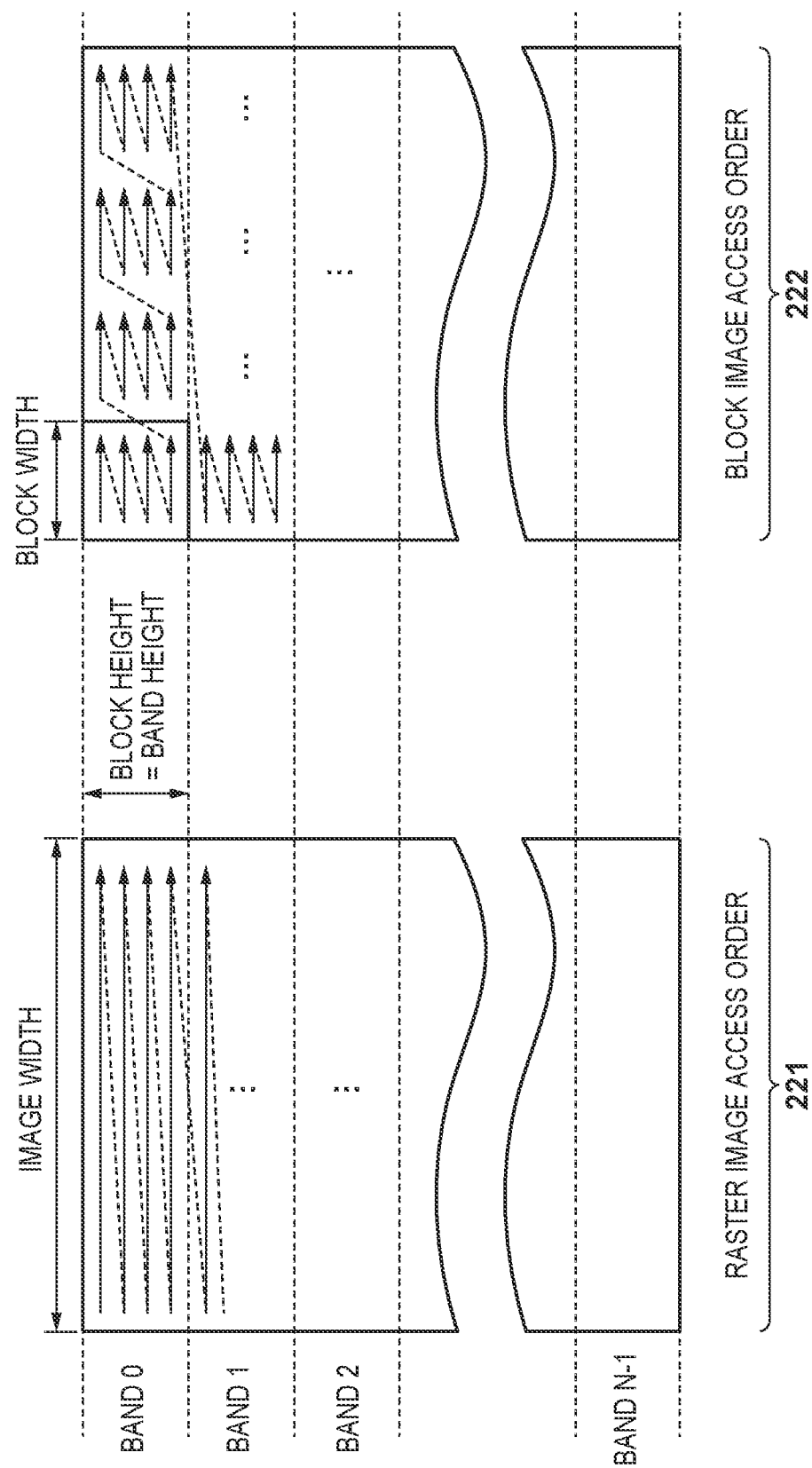
FIG. 2 is a conceptual diagram illustrating mutual conversion between a raster image and a block image according to an embodiment.

Next, with reference to FIG. 2, description is given regarding mutual conversion of a raster order and a block order. As illustrated by reference numeral 221, in the raster order, for a page image, pixels are accessed from a left edge of an image to a right edge by one horizontal scan. The horizontal scanning is continuously performed in a direction from the top edge of the page image to the bottom edge, and pixels of the entirety of the page image are accessed.

As illustrated by reference numeral 222, in a block order, in a predetermined rectangular area of a block width×a block height, each pixel is accessed similarly to with the previously described raster image. Here in the page image, the area of the image width×the block height is referred to as a band. The page image is divided into N bands in the vertical direction. For each block included in a band, each adjacent block is sequentially accessed from the left edge of the band to the right edge. When access to pixels in a band completes, the next adjacent band is accessed. In this way, by sequentially accessing each band, all pixels included in a page image are accessed.

<Configuration of Conversion Unit>

Figure 3:
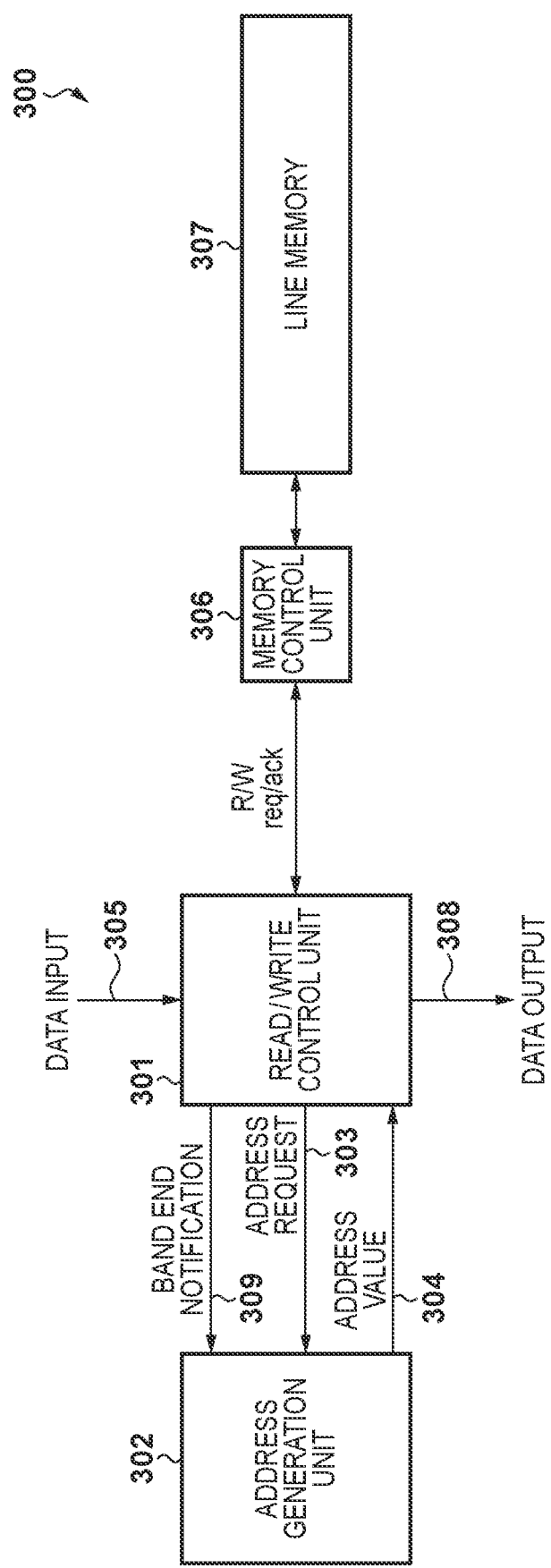
FIG. 3 is a block diagram illustrating a configuration of a conversion unit according to an embodiment.

Next, referring to FIG. 3, description is given regarding an internal configuration of the raster/block conversion unit 110 and the block/raster conversion unit 111. Here, the raster/block conversion unit 110 and the block/raster conversion unit 111 are collectively referred to as a conversion unit 300. The conversion unit 300 is provided with a Read/Write control unit 301, an address generation unit 302, a memory control unit 306, and a line memory 307.

The line memory 307 is a memory for performing conversion of an image order. The line memory 307 is configured by the SRAM, and has at least a band size worth of memory capacity. The Read/Write control unit 301 reads out image data from the line memory 307 via the memory control unit 306. The image data read out is transmitted to a data output bus 308. Similarly, the Read/Write control unit 301 writes image data input from a data input bus 305 to the line memory 307 via the memory control unit 306. Note, attention is given to that the Read/Write control unit 301 performs writing with respect to an address of the line memory 307 for which reading out was performed directly before. Because of this, data for which reading out has not completed is not lost due to newly written data.

The address generation unit 302 generates (calculates) a shared address for the Read/Write control unit 301 to perform reading-out/writing with respect to the line memory 307. Note that the address generation unit 302 generates a shared address for block order writing and raster order reading-out at a time of a block/raster conversion. In contrast, the address generation unit 302 generates a shared address for raster order writing and block order reading-out at a time of a raster/block conversion. Upon receiving an address request 303 from the Read/Write control unit 301, the address generation unit 302 replies with an address value 304 for accessing a next pixel. When reading-out/writing for one band's worth completes, the Read/Write control unit 301 transmits a band end notification 309 to the address generation unit 302. Upon receiving the band end notification 309, the address generation unit 302 changes a shared address generation pattern. Details of the address generation pattern are described later by FIG. 6.

<Operation of Conversion Unit>

Figure 4:
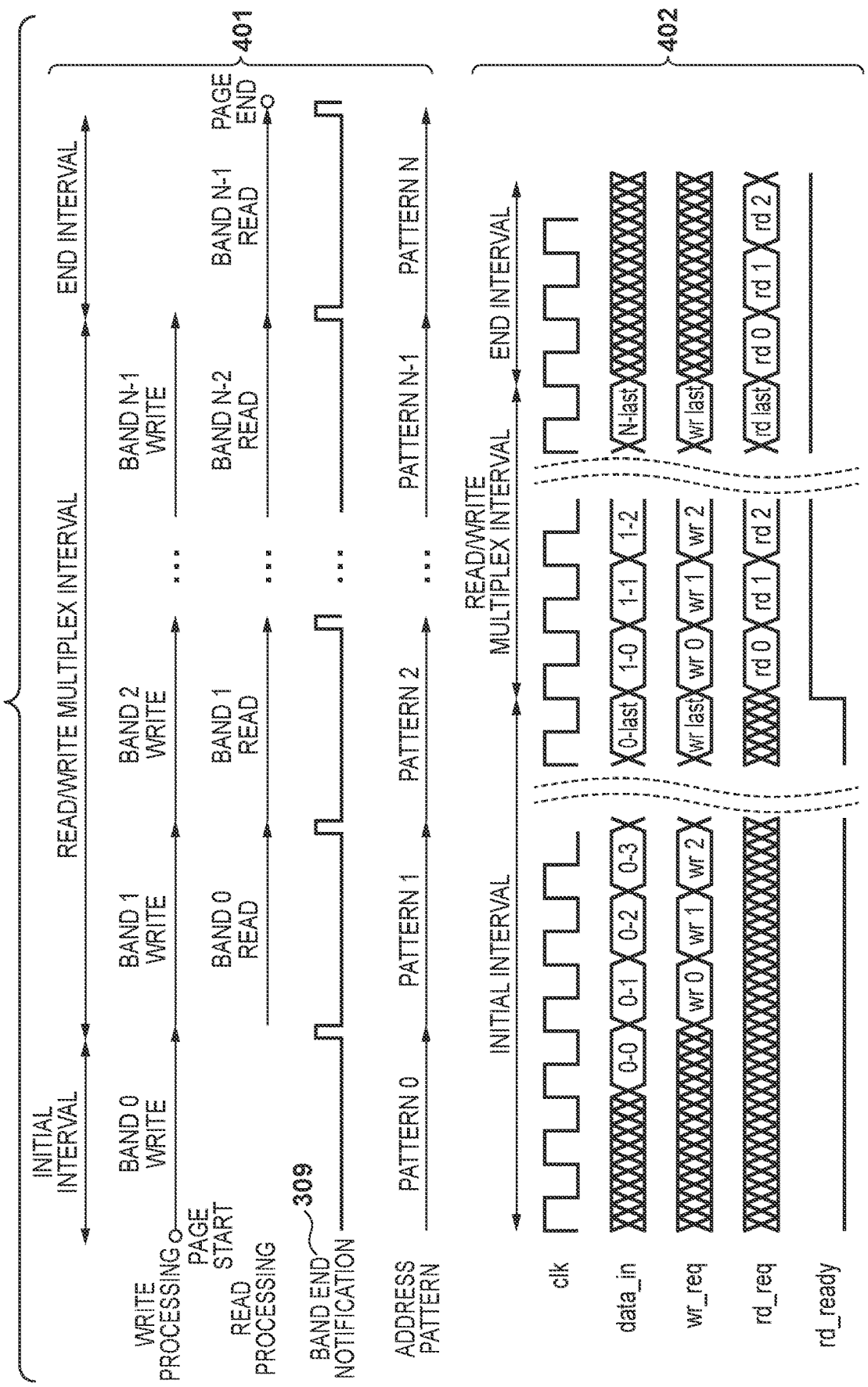
FIG. 4 is a timing chart illustrating an operational flow of the conversion unit according to an embodiment, and line memory Read/Write multiplex control.

Next, with reference to FIG. 4, description is given regarding operation of the conversion unit 300 as a whole. Reference numeral 401 illustrates a flow for read-out processing and write processing by the Read/Write control unit 301, and a transition of address patterns generated by the address generation unit 302. Note that, as illustrated by reference numeral 401, an order conversion is performed for a band n by pixel data being written to the line memory 307 by the address pattern n, and pixel data being read out from the line memory 307 by an address pattern n+1.

When page processing is started, the Read/Write control unit 301 writes the first band 0 to the line memory 307. At this point, the Read/Write control unit 301 uses a write address of an address pattern 0 generated by the address generation unit 302 to access the line memory 307. In addition, in an interval in which writing to the band 0 is being performed, the Read/Write control unit 301 does not perform a readout operation because data that should be read out is not present in the line memory 307. This interval is referred to as an initial interval.

When writing of the band 0 completes, the Read/Write control unit 301 notifies the band end notification 309 to the address generation unit 302. Upon receiving the band end notification 309, the address generation unit 302 starts generation of addresses by the address pattern 1. The Read/

Write control unit 301 writes a band 1 to a free area of the line memory 307 by the address pattern 1, and in parallel with this reads out the band 0, which is already written, by the address pattern 1. An interval in which the Read/Write control unit 301 performs a write operation and a readout operation in parallel is referred to as a Read/Write multiplex interval.

In a Read/Write multiplex interval, when a band N−1 is written to the line memory 307, all writing of an image for one page's worth completes. Also, it should be noted that the band N−1 represents the final band when dividing an image of one page into N bands. When writing of the band N−1 and reading-out of a band N−2 completes, the Read/Write control unit 301 starts a readout operation for the final band N−1. During this interval, because all writing of the page image has already completed, the Read/Write control unit 301 performs only a readout operation with respect to the line memory 307. This interval is referred to as an end interval. In the end interval, when reading out is complete for all data of band N−1, conversion processing of the page image completes.

Reference numeral 402 is a timing chart for describing writing and read out controlling of the Read/Write control unit 301 in more detail. In the initial interval, when valid data is input to the Read/Write control unit 301, only a write operation is performed. In the initial interval, the Read/Write control unit 301 does not perform read out control because an rd_ready signal is not asserted. Note that, for the rd_ready signal, it may be held as an internal flag by the Read/Write control unit 301, or configuration may be taken such that control is provided from an external unit.

When a write operation (wr last) for block 0 (block 0-last) completes, the rd_ready signal is asserted, and the Read/Write control unit 301 starts reading out. Simultaneously, when valid data (1-0) is input, the Read/Write control unit 301 performs a write operation. Note that, in the present embodiment, the Read/Write control unit 301 performs a write operation and a readout operation in the same clock cycle.

In addition, the Read/Write control unit 301 performs a readout operation only when valid data is input and a write operation is performed. In other words, the Read/Write control unit 301 does not perform a readout operation as long as valid data is not input and a write operation is not performed. By performing such operations, it is possible to make an address used by writing and reading out to be always shared.

Note that, performing reading out and writing in the same clock cycle as in the present embodiment can be realized by using dual port SRAM or the like as the line memory 307. In addition, if the line memory 307 has performed reading out and writing to the same address, attention is given to the need to configure such that, for data that is read out, old data that has already been written is read out instead of new data that is being written. Such a function of the SRAM is also referred to as a read-first function or the like.

Meanwhile, in the end interval, the Read/Write control unit 301, irrespective of reception of valid data, performs a readout operation until all of band N−1 is read out. Note that the Read/Write control unit 301 distinguishes whether it is in the end interval by counting a number of bands for which reading-out has been performed. Alternatively, the distinguishing may be performed by using a page end signal (not shown) or the like on the data input bus 305.

<Address Patterns>

Next, with reference to FIG. 5, description is given regarding control for the Read/Write control unit 301 to access the line memory 307 in accordance with address patterns generated by the address generation unit 302. In FIG. 5, letting the image width=7, the block width=1, and the block height=3, a situation in which a raster/block conversion is performed by using the line memory 307 which has a size of 7×3 is illustrated. Below, there is a plurality of word areas included in a block, and an area corresponding to a smallest area (one pixel) is referred to as a cell.

A numerical value 502 illustrated on a top-left portion of a cell 501 illustrated an address assigned to one word area. Note that, because the address depth of the line memory 307 is 7×3=21, addresses for 0 to 20 are assigned to the respective words. A numerical value 503 illustrated with underlining in a central portion of the cell 501 indicates an order in which the Read/Write control unit 301 accesses each word of the line memory 307 in the address pattern n.

In an address pattern 0 illustrated by reference numeral 510, raster-order pixel data is accessed while causing an address to increase by one each time, linearly with respect to the line memory 307. Note that an increased amount from an address currently being accessed to an address to access next is referred to as an address increased amount. In the address pattern 0, the address increased amount is 1.

In the address pattern 1 illustrated by reference numeral 520, raster-order pixel data of the band 0 that is written by the address pattern 0 is read out as block-order pixel data. Simultaneously, raster-order pixel data of the band 1 is written by the address pattern 1 as raster-order pixel data. In the address pattern 1, access for reading-out of the band 0 and writing of the band 1 is performed while causing an address to increase by the address increased amount=7 each time. Also, in the case of an overflow in which a value obtained after adding the address increased amount to the current address is greater than or equal to the address depth, the value of the address depth is subtracted, and 1 is added. In other words, the address depth−1 is subtracted. For example, although the address increases from 0 to 7 to 14 to 21, because 21 is greater than the address depth value of 20, it is calculated as 21−20=1. Similarly, with reference numerals 530 and 540, when an address is sequentially increased by the address increased amount each time and the address value overflows, the address depth−1 is subtracted.

Figure 6:
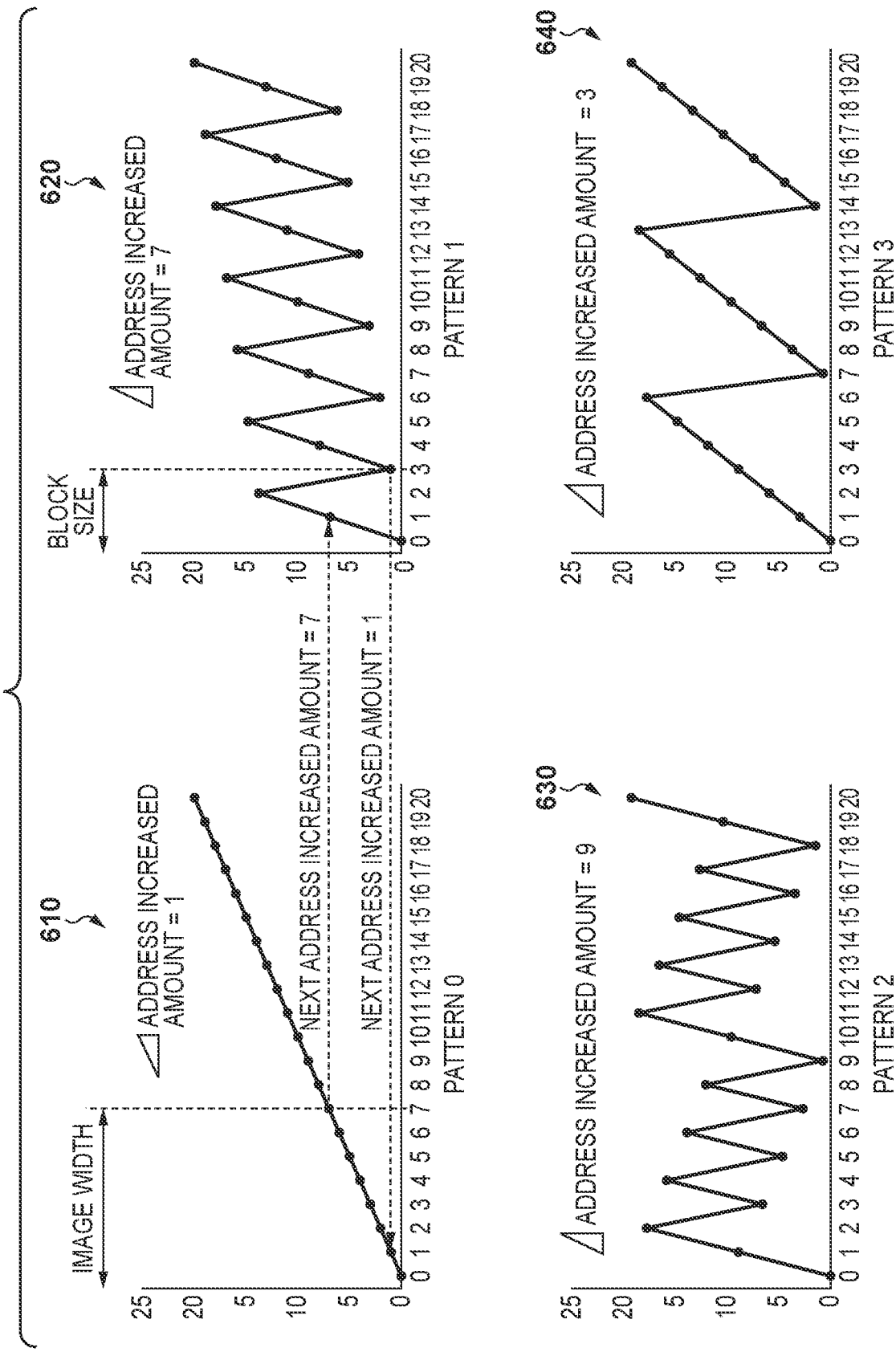
FIG. 6 is a view illustrating an example of an address pattern generated by an address generation unit according to an embodiment.

Next, with reference to FIG. 6, a graph represented as a function is used to give an explanation regarding an example of an address pattern generated by the address generation unit 302. The abscissa for each graph illustrates a cycle for access, and the ordinates respectively illustrate address values generated in each cycle. Reference numerals 610-640 respectively correspond to reference numerals 510-540 of FIG. 5. The address function of FIG. 6 illustrates an example in which the image width=7, the block height=3 and the block width=1, but a universal representation with an arbitrary image width and block height is possible. Letting a cycle be t, an address increased amount be α, and an address depth be an address addr(t) at a cycle t is represented by Equation (1) below.

$$\mathrm{addr}(t) = \{\mathrm{addr}(t-1)+\alpha\} \bmod \beta + [(\mathrm{addr}(t-1)+\alpha)/\beta] \quad (1)$$

Here, it should be noted that the brackets [ ] represent a floor function. In other words it indicates a quotient when $(\mathrm{addr}(t-1)+\alpha)$ is divided by $\beta$. By Equation (1), an address function for performing, with respect to the line memory 307, reading-out of the band n and writing of the band n+1 is obtained. It should be noted that Equation (1) is limited to block width=1.

It is possible to realize application of Equation (1) to an arbitrary block width by dividing the line memory 307 into a number of block widths. In other words, before performing writing to the line memory 307, a serial-parallel conversion is performed on the image data to get rectangular image units of the block width×1, and simultaneously writing is performed to the respective same address of SRAM which is divided proportionally to the number of block widths. In addition, when performing reading-out from the line memory 307, a parallel-serial conversion is performed after simultaneously reading-out the aforementioned rectangular image units from the same address, from the SRAM which is divided proportionally to the number block widths. By such an operation, it becomes possible to obtain by Equation (1) an address value for accessing the divided SRAM.

It is possible to very easily realize implementation of Equation (1) in hardware by bit division if the address depth β is a power of 2. In Equation (1), the first and second terms respectively represent the remainder and the quotient when integer division by β is performed on a value obtained by adding α to the current address value. Accordingly, if β is a power of 2, the quotient and the remainder can be respectively obtained by dividing the log 2(β) bit from the most significant bit and the least significant bit from the log 2(β)−1 bit.

Next, description is given regarding the method of calculating an address increased amount α(n) in the address pattern n. In the address pattern 0 of reference numeral 610 of FIG. 6, an address value at t=7 matches the address increased amount in the address pattern 1 of reference numeral 620 of FIG. 6. Similarly, in the address pattern 1 of reference numeral 620 of FIG. 6, an address value at t=3 matches the address increased amount in the address pattern 0. Cycles t=7 and t=3 are respectively the image width and the block size (block width×block height). Because this holds true for any address pattern n, it is possible to universally represent the address increased amount α(n) in an address pattern n. Letting an address function for an address pattern n be addrn(t), the image width be $I_W$, the block width be $B_W$, and the block height be $B_H$, the address increased amount α(n) for the address pattern n is represented by the following equations.

$$\alpha(n) = \text{addr}_{n-1}(I_W) \quad (2)$$

$$\alpha(n) = \text{addr}_{n-1}(B_W \times B_H) \quad (3)$$

Equation (2) represents the address increased amount α(n) for the address pattern n when performing a raster/block conversion. Equation (3) represents the address increased amount α(n) for the address pattern n when performing a block/raster conversion. By using Equation (1), Equation (2), and Equation (3), with any image size and block size, it becomes possible to obtain an address value for performing a mutual conversion of a block order and a raster order.

<Address Generation Processing>

Figure 7:
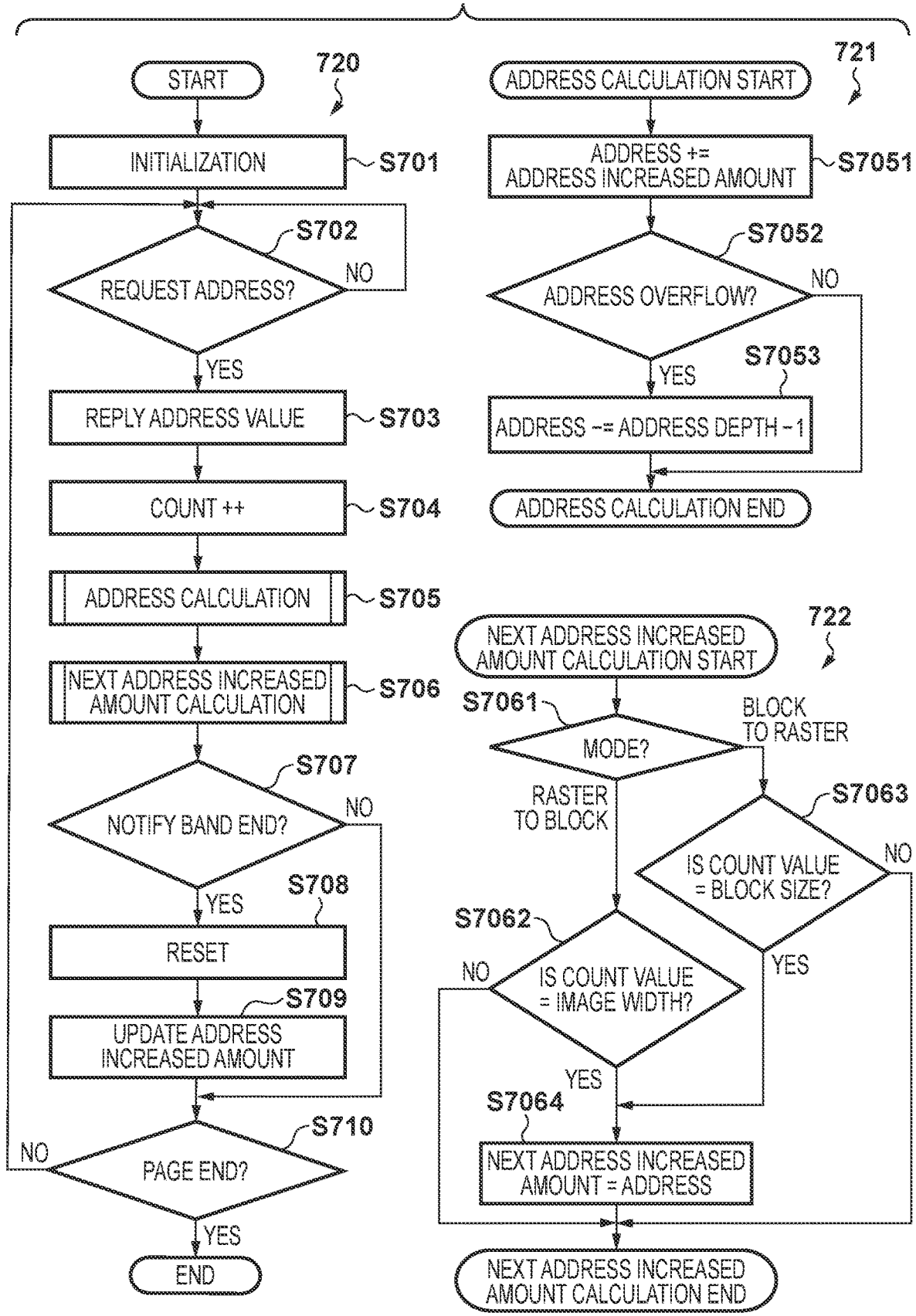
FIG. 7 is a flowchart illustrating a control flow of the address generation unit according to an embodiment.

Next, with reference to FIG. 7, description is given regarding a processing procedure for address generation processing based on Equation (1) through Equation (3) in the address generation unit 302. Note that the processing described below is performed by the address generation unit 302. In addition, processing described below may be realized by the CPU 201 reading out a control program stored in the ROM 203 or the HDD 204 into the RAM 202, and executing it.

Firstly, description is given regarding the flowchart of reference numeral 720. In step S701, the address generation unit 302 performs initialization. Specifically, the address generation unit 302 resets the address value 304 and the address request count value to "0", and sets the address increased amount α(0) to "1" which is an initial value.

In step S702, the address generation unit 302 determines whether it has received an address request 303 from the Read/Write control unit 301. It waits until receiving one, and upon receiving the processing proceeds to step S703. In step S703, the address generation unit 302 replies to the Read/Write control unit 301 with the current address value 304. Next, in step S704, the address generation unit 302 increments the count value.

In step S705, the address generation unit 302 calculates the next address value 304. Here, a flowchart 721 is used to give a description regarding detail of the calculation of the address value 304 in step S705. Firstly, in step S7051, the address generation unit 302 adds the address increased amount α(n) to the address value 304. Next, in step S7052, the address generation unit 302 determines whether the address value 304 overflows out of the address range. In a case of overflow, the processing proceeds to step S7053, and the address generation unit 302 subtracts the value of the address depth β−1 from the address value 304, and the processing of step S705 ends. Meanwhile, in step S7052, in a case of no overflow, the processing of step S7053 is not performed, and the processing of step S705 ends.

Description of the flowchart 720 is returned to. In step S706, the address generation unit 302 calculates the address increased amount α(n+1) for the next address pattern. Here, a flowchart 722 is used to give a description regarding detail of the calculation of the next address increased amount α(n+1) in step S706. Firstly, in step S7061 the address generation unit 302 determines whether the current operational mode is a block/raster conversion or a raster/block conversion. If the current operational mode is for a raster/block conversion, the processing proceeds to step S7062, and if it is for a block/raster conversion, the processing proceeds to step S7063.

In step S7062, the address generation unit 302 determines whether the count value has reached the image width $I_W$, and if this has been reached the processing proceeds to step S7064. If not reached the processing of step S706 ends. Similarly, in step S7063, the address generation unit 302 determines whether the count value has reached the block size ($B_W \times B_H$), and if this has been reached the processing proceeds to step S7064, and if this has not been reached the processing of step S706 ends. In step S7064, the address generation unit 302 obtains the current address value 304 as the address increased amount α(n+1) in the next address pattern, and ends the processing of step S706.

Description of the flowchart 720 is returned to. In step S707, the address generation unit 302 determines whether a band end notification 309 has been received, and if received the processing proceeds to step S708, and if not received the processing proceeds to step S710. In step S708, the address generation unit 302 receives the band end notification 309, and resets the count value and the address value 304. Next, in step S709 the address generation unit 302 updates the address increased amount α(n) by the value α(n+1) obtained in step S7064. In step S710, the address generation unit 302 determines whether all conversion processing in the page has completed, and if it has ended this flow ends. If it has not ended step S702 is returned to.

<Variation>

The present invention is not limited to the configuration described above, and various variations are possible. For example, although description was given here regarding a configuration in which the processing of the address generation unit 302 is realized by the CPU 201 executing a control program, the address generation unit 302 may be implemented by hardware.

Figure 8:
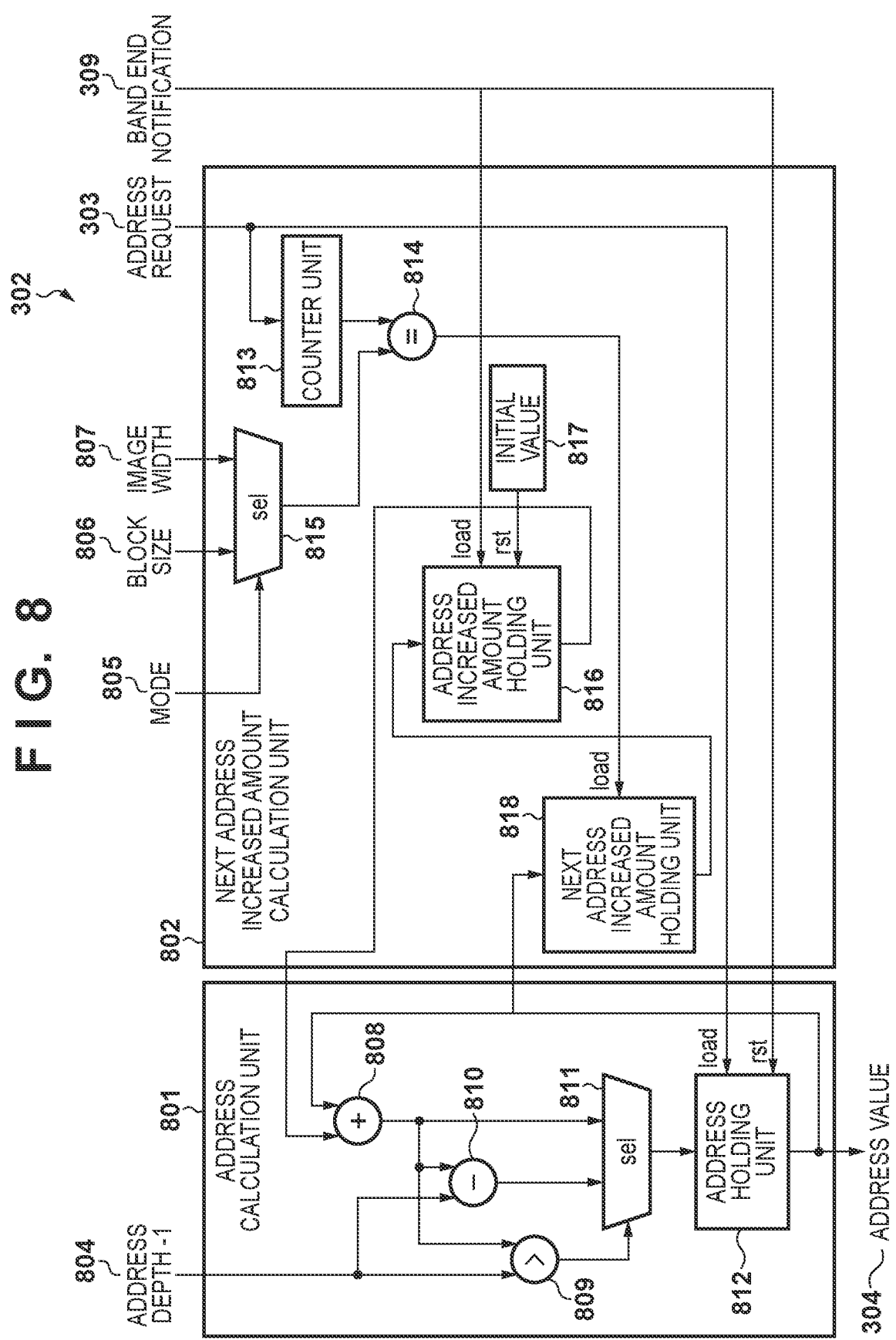
FIG. 8 is a view illustrating an example of a configuration of the address generation unit according to an embodiment.

With reference to FIG. 8, description is given regarding an example of a configuration for a case in which the address generation unit 302 is implemented by hardware. As registers for operation, the address generation unit 302 has an address depth β (an actual value is the address depth−1) 804, an operation mode 805, a block size 806, and an image width 807. In addition, it has the address request 303, the band end notification 309, and the address value 304 as I/Fs with the Read/Write control unit 301. The address generation unit 302 has an address calculation unit 801 and a next address increased amount calculation unit 802.

The address calculation unit 801 has an address holding unit 812 for holding the address value 304. Upon receiving the address request 303, the address holding unit 812 loads a next address value. In addition, the address holding unit 812 is reset upon receiving the band end notification 309. The address calculation unit 801 has an adder 808 for adding the address increased amount and the current address value. In addition, the address calculation unit 801 has a comparator 809 for performing detection of overflow, a subtractor 810 for subtracting the address depth−1 at a time of an overflow, and a selector 811 for switching a computation result in accordance with the existence or absence of an overflow. The subtractor 810 subtracts the addition result (the address value after the adding) of the adder 808 from the address depth 804. The addition result of the adder, a subtraction result of the subtractor 810, and a comparison result of the comparator 809 are input to the selector 811, and the addition result or the subtraction result is selected based on the comparison result.

The next address increased amount calculation unit 802 has an address increased amount holding unit 816 for holding the current address increased amount. Upon receiving the band end notification 309, the address increased amount holding unit 816 loads a new address increased amount from a next address increased amount holding unit 818. In addition, the address increased amount holding unit 816 is set to an initial value 817 at a reset time. In the present embodiment, the initial value 817 is 1. The next address increased amount calculation unit 802 has a counter unit 813 for counting a number of the address request 303, and a comparator 814 for comparing as to whether count value is the image width 807 or the block size 806. In addition, it has a mode selector 815 for switching a count number at which to obtain a next address increased amount, in accordance with a mode.

As described above, the image processing apparatus according to the present embodiment divides image data into a plurality of areas in units of bands, and performs writing and reading-out of the divided image data in units of bands with respect to one line memory. Because of this, the image processing apparatus mutually converts raster-order image data and block-order image data. In addition, the present image processing apparatus calculates, in units of bands, an address increased amount, which is used for calculating an address to next write to or read out from, from an address that is a current processing target. In addition, the present image processing apparatus calculates an address of a write destination when writing image data to the line memory and an address of a readout destination when reading-out image data from line memory by adding a calculated address increased amount to an address value of the address of the current processing target. Furthermore, the present image processing apparatus, in accordance with the calculated addresses, accesses the line memory and executes writing and reading-out of the image data. By performing address generation in this way, it becomes possible to perform mutual conversion of a block order and a raster order for any image size or block size. In the present embodiment, address generation can be realized by very easy control of defining, as a parameter for address generation, the address increased amount α, and adding the address value to the address increased amount α while considering an overflow. Variables other than the address increased amount α become unnecessary. This means that is possible to suppress control becoming complicated due to differences in operational mode, image size or block size. In addition, there is no necessity to consider the position in a block of a pixel that is a current processing target. Furthermore, the calculation of the address increased amount α can be realized by very simple control of counting a number of accesses and obtaining an address value appearing at a specific number.

Second Embodiment

Below, description will be given for a second embodiment of the present invention. In the above first embodiment, discussion was given regarding a configuration in which only one address generation unit 302 is used, and writing and reading-out with respect to the line memory 307 are always simultaneously performed. In the present embodiment, discussion is given regarding a configuration that can improve overall throughput of the image processing apparatus 100 by separately providing two of the address generation unit 302—for reading-out and for writing—as a hardware implementation. Note that, in the present embodiment, description is given mainly regarding differences with the aforementioned first embodiment, and a description regarding common points is omitted.

Figure 9:
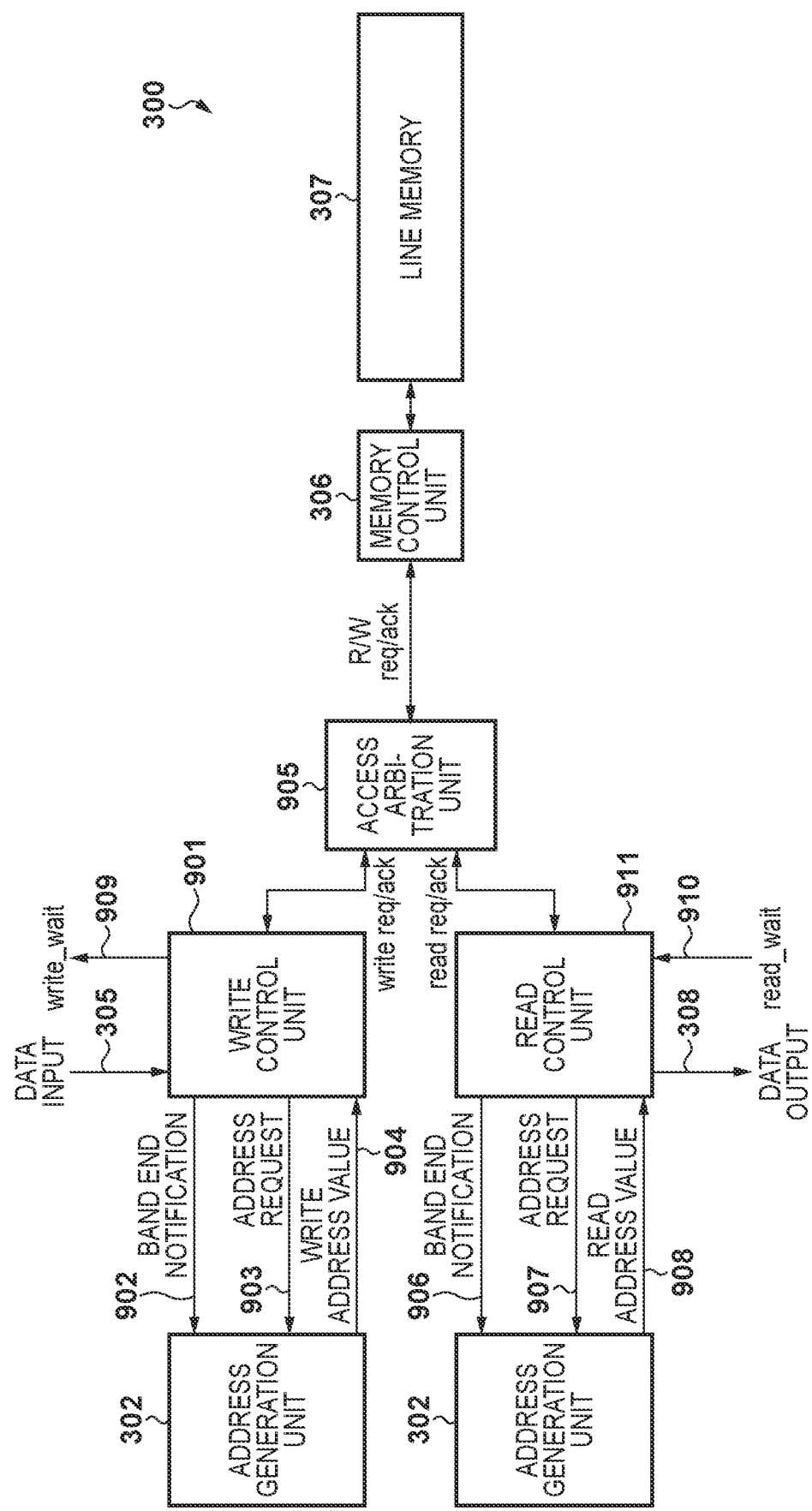
FIG. 9 is a block diagram illustrating a configuration of a conversion unit according to an embodiment.

Next, with reference to FIG. 9, description is given regarding an internal configuration of the conversion unit 300. A difference with the first embodiment is a point that the conversion unit 300 has two of the address generation unit 302—for writing and for reading-out. In addition, the conversion unit 300 has a Write control unit 901 for control writing to the line memory 307, and a Read control unit 911 for controlling reading-out. The Write control unit 901 uses a band end notification 902 and an address request 903 to obtain a Write address value 904 from the address generation unit 302.

Similarly the Read control unit 911 uses a band end notification 906 and an address request 907 to obtain a Read address value 908 from the address generation unit 302. An access arbitration unit 905 arbitrates write and readout requests from the Write control unit 901 and the Read control unit 911. In the band currently being processed, the access arbitration unit 905 selectively accepts a write request from the Write control unit 901 so that a write operation does not overtake a readout operation by counting a number of times writing and reading-out has been performed. In addition, when a band readout operation of the Read control unit 911 has completed, the access arbitration unit 905 does not accept a read request from the Read control unit 911 until a band write operation of the Write control unit 901 has completed.

Upon being notified of writing prohibited from the access arbitration unit 905, the Write control unit 901 notifies a previous stage processing unit of the conversion unit 300 that it could not receive valid data, by asserting a write_wait signal 909. The Read control unit 911 goes in advance and performs the readout operation without waiting for valid data reception by the Write control unit 901. In addition, upon receiving a read_wait signal 910 from a latter-stage processing unit of the conversion unit 300, the Read control unit 911 interrupts read out controlling with respect to the line memory 307. In this way, by operation of the access arbitration unit 905, mutual conversion of a block order and a raster order becomes possible without disrupting an address pattern, even if the Write control unit 901 and the Read control unit 911 are operating at respective timings.

<Operation of Conversion Unit>

Figure 10:
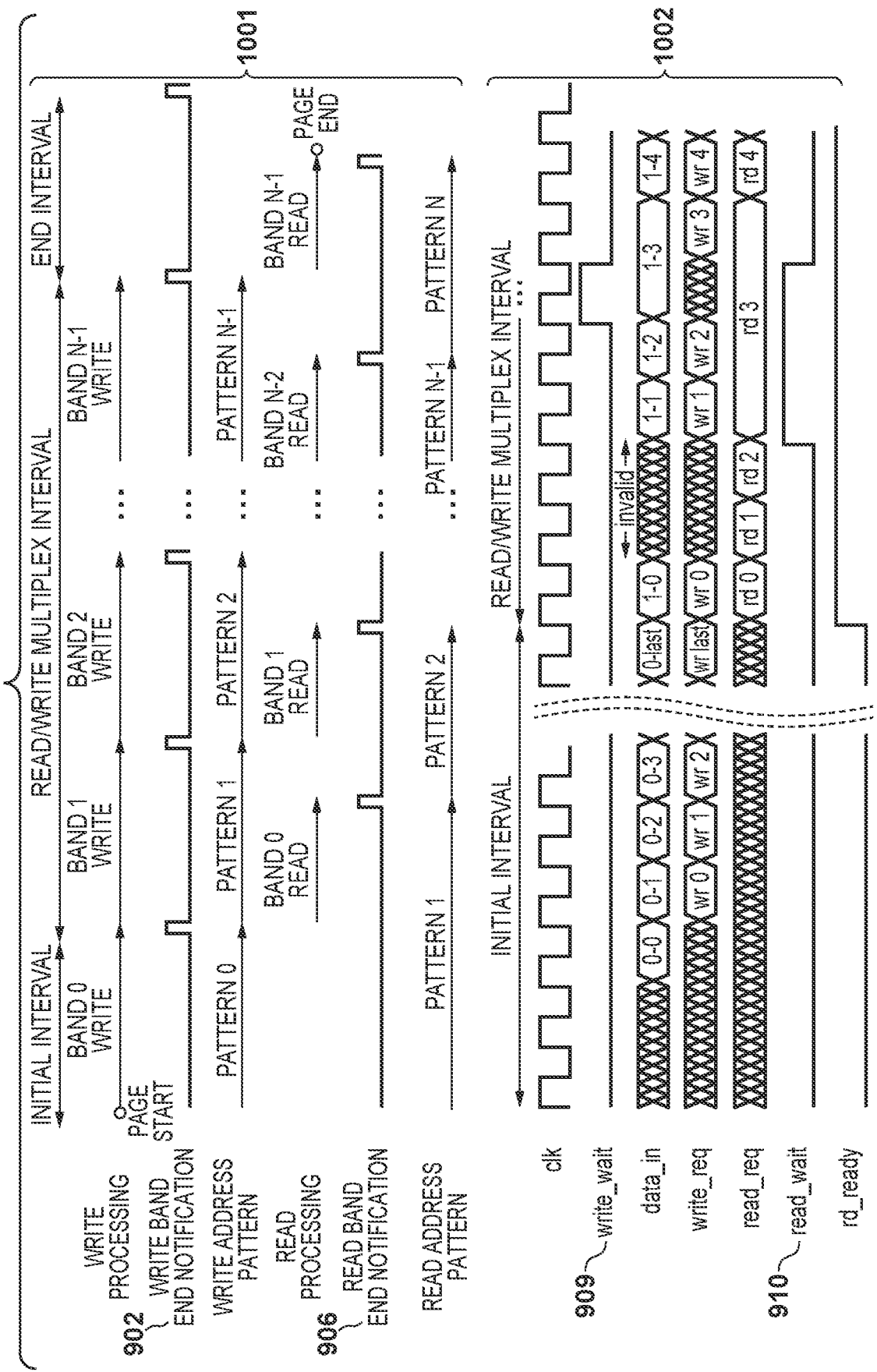
FIG. 10 is a timing chart illustrating an operational flow of the conversion unit according to an embodiment, and Read/Write multiplex control to a line memory.

Next, with reference to FIG. 10, description is given regarding operation of the conversion unit 300. Reference numeral 1001 of FIG. 10 illustrates an operational flow of the Write control unit 901 and the Read control unit 911. A difference from the aforementioned first embodiment is a point that control of reading-out and writing with respect to the line memory 307 is not always simultaneous, and is performed in accordance with respective timings of the Write control unit 901 and the Read control unit 911. In the present embodiment, configuration is such that operation of the conversion unit 300 overall may not need to be stopped even if the read_wait signal 910 is asserted, by causing reading-out by the Read control unit 911 to always be in advance.

As illustrated by reference numeral 1002 of FIG. 10, even if the read_wait signal 910 is asserted, for a number of accesses for which a readout operation went in advance, it is possible to continue to perform write operations. This means that, in the image processing apparatus 100, the conversion unit 300 fulfills the role of a buffer of absorbing a processing interruption time of each processing unit of the image processing apparatus 100—and not only conversion of an image order.

As described above, for the image processing apparatus 100 according to the present embodiment, mutual conversion of a block order and a raster order while causing throughput to improve is possible by having the configuration described above. In the present embodiment, although two of the address generation unit 302 are provided, as described in the first embodiment above, because it is possible to have the address generation unit 302 be a very simple configuration, it is not the case that providing two thereof will greatly increase circuit scale. In addition, it is possible to use the address generation unit 302 in exactly the same configuration on a writing side and a reading-out side. Furthermore, when providing two of the address generation unit 302, there is no need to add special control for address generation.

Third Embodiment

Below, explanation will be given for a third embodiment of the present invention. In the above first embodiment, description was given of a block/raster conversion in a case where a block width was limited to 1. In the above first embodiment, if a block width is set to be other than 1, a serial-parallel conversion or a division of the line memory 307 becomes necessary. In the present embodiment, description is given regarding a method of directly generating an address that does not need division of the line memory 307, an additional serial-parallel conversion, or the like.

<Address Pattern>

With reference to FIG. 11, description is given regarding control for the Read/Write control unit 301 to access the line memory 307 in accordance with an address pattern generated by an address generation unit 1400 in the present embodiment. Note that, in FIG. 11, letting the image width=6, the block width=2, and the block height=2, a situation in which raster/block processing is performed by using the line memory 307 which has a size of 6×2 is illustrated. As illustrated by reference numeral 1110-1140 of FIG. 11, pixels of the block width×1=2×1 are always accessed as a pair. In the present embodiment, an address increased amount is defined by pair units of the aforementioned block width number. In other words, with reference numeral 1110, an increased amount 2 is defined as the address increased amount for accessing the second and third pixel pairs after accessing the zero-th and first pixel pairs. Similarly, the address increased amount is respectively 6, 8, and 4 for the reference numerals 1120, 1130, and 1140.

Figure 12:
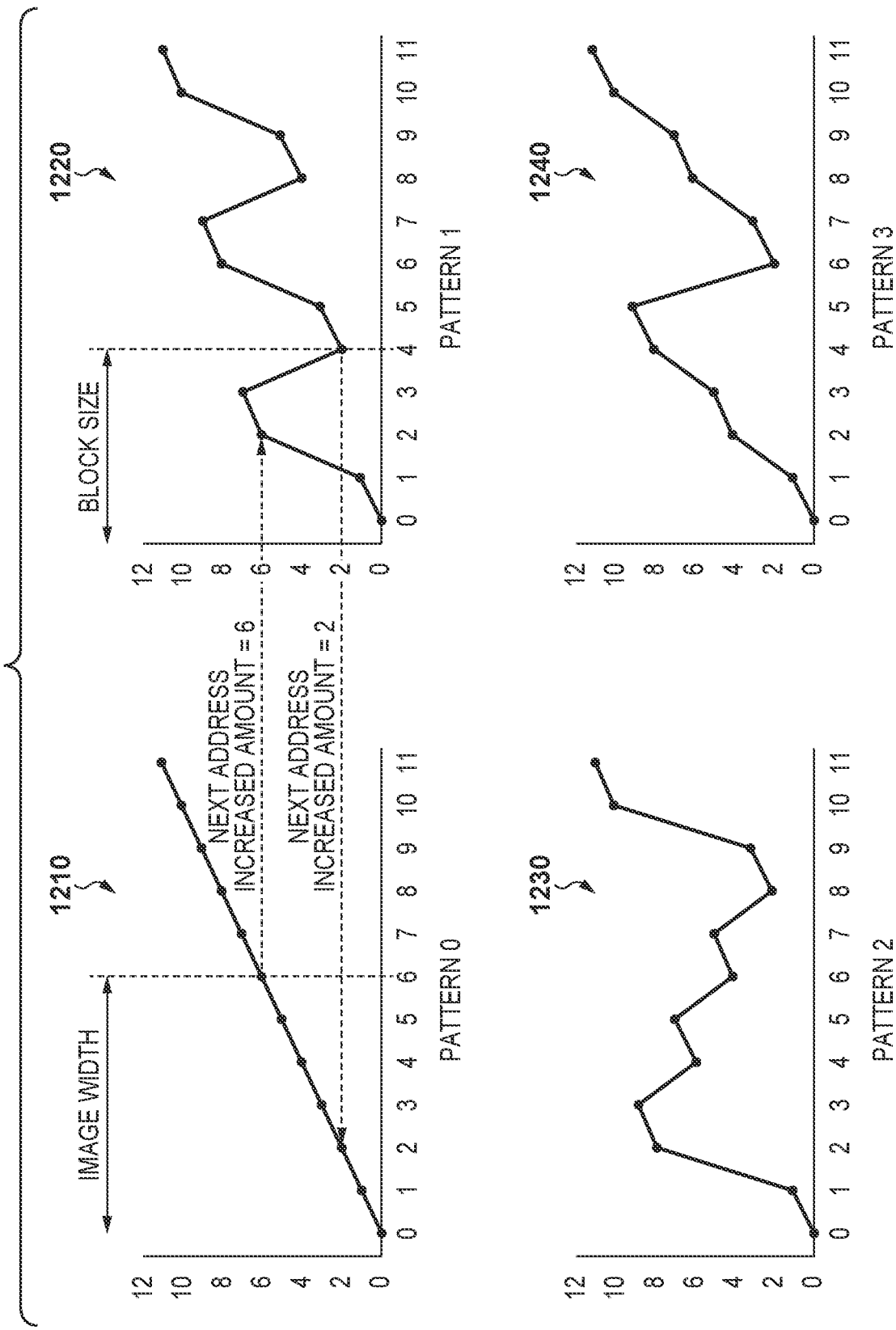
FIG. 12 is a view illustrating an example of a pattern of addresses generated by an address generation unit according to an embodiment.

Next, with reference to FIG. 12, a graph represented as a function is used to give an explanation regarding an example of an address pattern generated by the address generation unit 1400. An abscissa for each graph illustrates a cycle for access, and an ordinate illustrates an address value generated in each cycle. The reference numerals 1210-1240 of FIG. 12 respectively correspond to the reference numerals 1110-1140 of FIG. 11. Similarly to the above first embodiment, it is possible to represent an address function by universalizing it to any image width, block height, and block width. Letting a cycle be t, an address increased amount be α, an address depth be β, and a block width be $B_W$, an address addr(t) at a cycle t is represented by Equation (1) below.

$$\text{base\_addr}(t) = \{\text{base\_addr}(t'-1)+\alpha\} \bmod \beta + B_W[\text{base\_addr}(t'-1)+\alpha)/\beta] \quad (4)$$

$$t' = [t/B_W] \quad (5)$$

$$\text{addr}(t) = t \bmod B_W + \text{base\_addr}(t) \quad (6)$$

In addition, as illustrated in FIG. 12, even if the block width $B_W$ is other than 1, calculation of the address increased amount is obtained by obtaining the address values for the address equal to the image width and the address equal to the block size. Accordingly, for calculation of the address increased amount α(n) at any address pattern n, Equations (2) and (3) can be used unchanged.

<Address Generation Processing>

Figure 13:
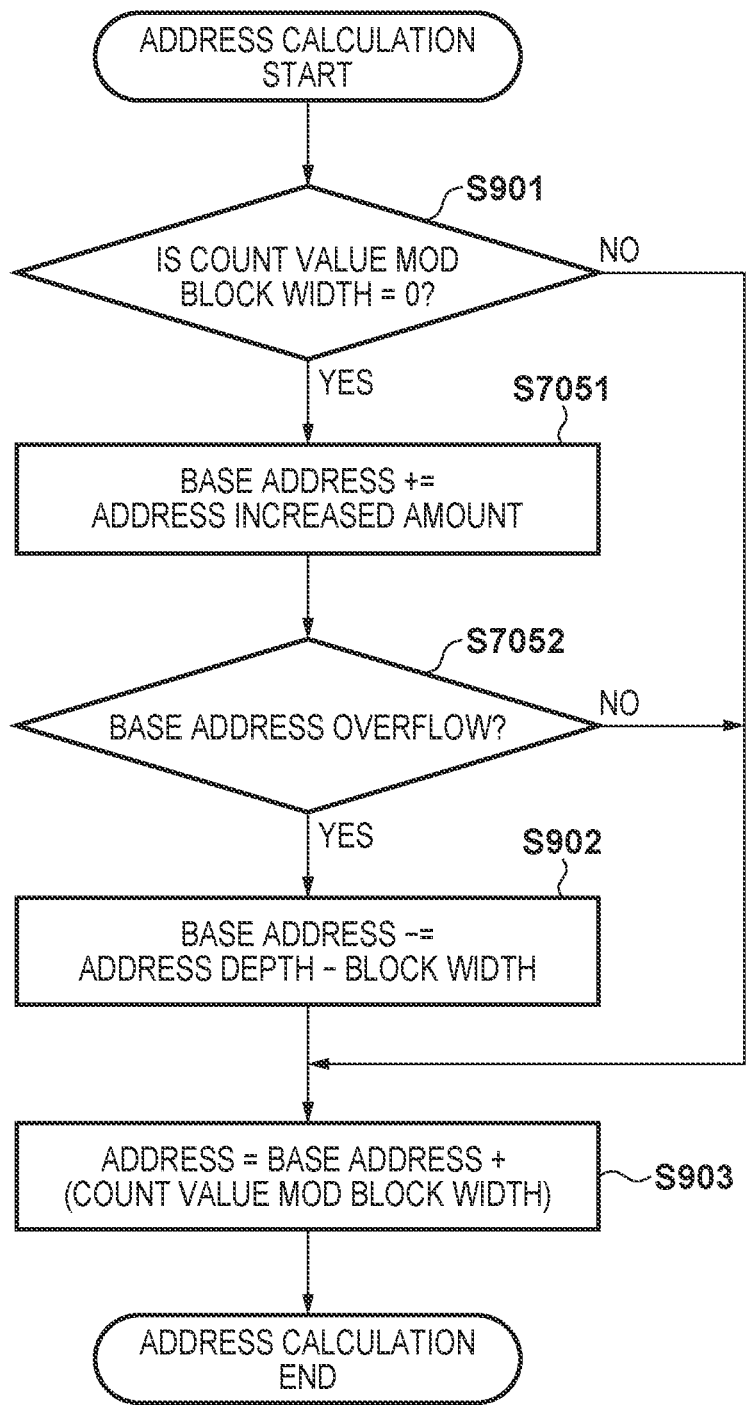
FIG. 13 is a flowchart illustrating a control flow of the address generation unit according to an embodiment.

Next, with reference to FIG. 13, description is given regarding a processing procedure for address generation processing in the address generation unit 1400 in a case when the block width is any value, based on Equation (2), Equation (3), Equation (4), Equation (5), and Equation (6). Note that the processing described below is performed by the address generation unit 302. In addition, processing described below may be realized by the CPU 201 reading out a control program stored in the ROM 203 or the HDD 204 into the RAM 202, and executing it.

Note that because the overall control flow is similar to the flowchart 720 of FIG. 7, description thereof is omitted. Differences from the above first embodiment are only the initialization process of step S701, and processing for address calculation in step S705. In the initialization of step S701, only a point of setting the block width $B_W$ as the initial value 817 of the address increased amount α(n) is different. In the processing of step S705, the processing of step S7051 and step S7052 in the flowchart 721 of FIG. 7 is similar to that in the aforementioned first embodiment.

In step S901, the address generation unit 1400 determines whether the count value is a multiple of the block width. In other words, it determines, for the count value, whether access for a pixel group for a number of block width's worth has completed. In step S901, if access has completed, the base address is updated in accordance with the processing of step S7051, step S7052, and step S902. In contrast, if access is not completed, the processing proceeds to step S903 without updating the base address.

In step S902, the address generation unit 1400 differs from step S7053 regarding the subtraction at a time of an overflow, and subtracts a value of the address depth—the block width, and then the processing proceeds to step S903. In the present embodiment, the procedures of step S7051, step S7052, and step S902 are performed as calculations of a base address with respect to a pixel group of a number of block widths worth. In step S903, the address generation unit 1400 updates the address value in accordance with the aforementioned Equation (6), and the address calculation processing of step S705 ends. In the aforementioned Equation (6), a residue number obtained by dividing a number of times that an address request has been received (the count value) by the block width is added to the address generated by a base address generation unit 1401.

<Variation>

The present invention is not limited to the configuration described above, and various variations are possible. For example, although description was given here regarding a configuration in which the processing of the address generation unit 302 is realized by the CPU 201 executing a control program, the address generation unit 1400 may be implemented by hardware.

Figure 14:
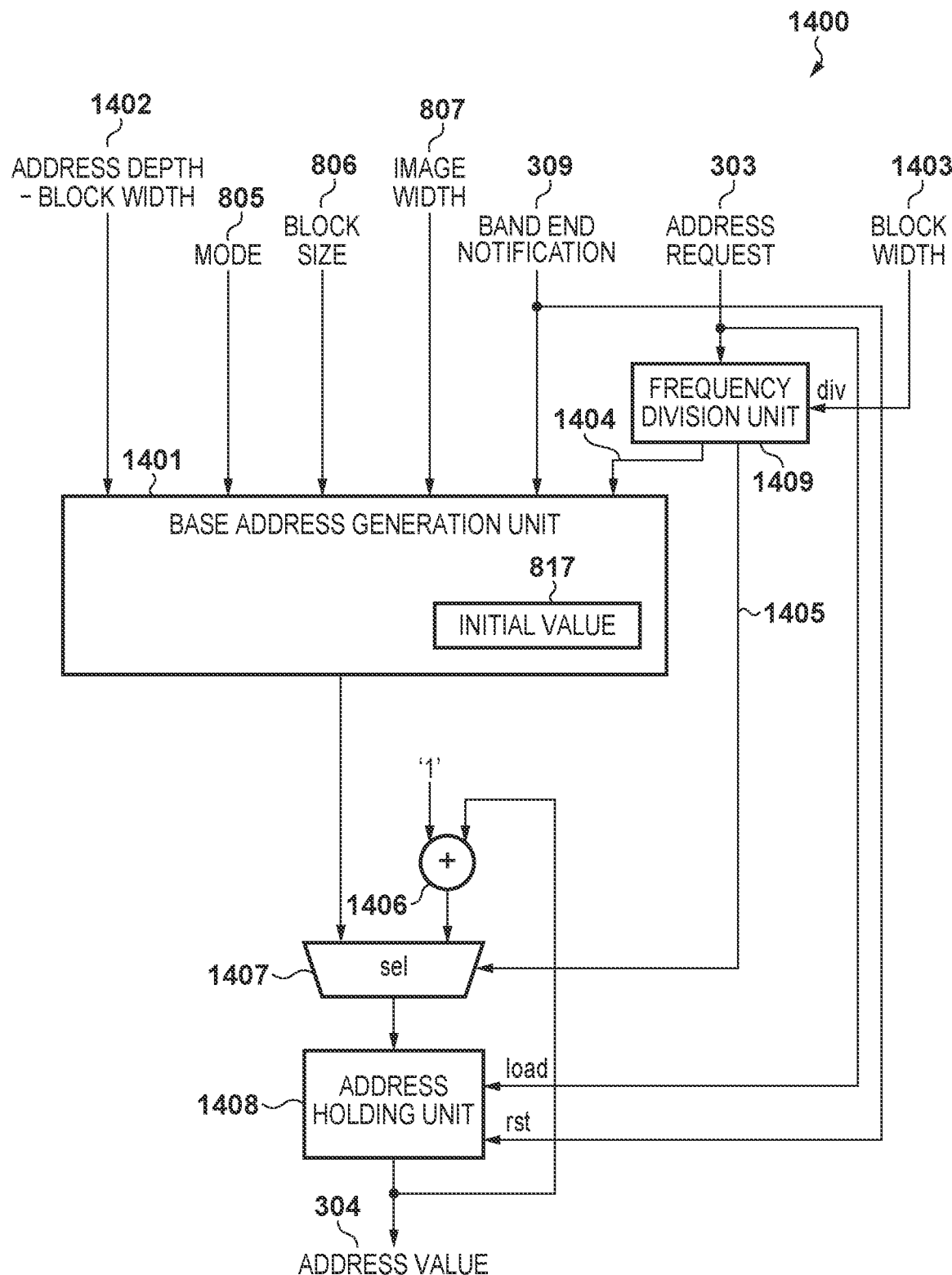
FIG. 14 is a view illustrating an example of a configuration of the address generation unit according to an embodiment.

With reference to FIG. 14, description is given regarding an example of a configuration for a case in which the address generation unit 1400 is implemented by hardware. The address generation unit 1400 has the base address generation unit 1401, and this has the same configuration as that of the address generation unit 302 in the aforementioned first embodiment. Note that the block width $B_W$ is set as the initial value 817 for the base address generation unit 1401. In addition, the base address generation unit 1401 has the address depth β—the block width 1402 as a register for overflow processing in a base address generation operation.

The address generation unit 1400 additionally has a frequency division unit 1409 for division of the address request 303 in accordance with Equation (5). The frequency division unit 1409 accepts a block width 1403 as a division ratio. In addition, address requests 1404 and 1405 divided by the frequency division unit 1409 are respectively input to the base address generation unit 1401 and the selector 1407. Configuration may be taken such that the divided address request 1404 operates one clock cycle earlier than the divided address request 1405, for operation timing adjustment.

The address generation unit 1400 additionally has an adder 1406, the selector 1407, and an address holding unit 1408, for calculating an address in accordance with Equation (6). Upon receiving the address request 303, the address holding unit 1408 loads a next address value. In addition, the address holding unit 1408 is reset upon receiving the band end notification 309.

As described above, an image processing apparatus according to the present embodiment, by performing address generation by control described above, does not need division of the line memory 307, an additional serial-parallel conversion, or the like for any block width, and can directly generate an address. In the present embodiment, that extension to any block width is possible by only an addition of a small scale configuration to the control of the aforementioned first embodiment was indicated. Specifically, this is only the addition of the addition indicated by Equation (6) and the division of the address request 303 indicated by Equation (5). By this additional control, extension to any block width by only adding two processes (step S901 and step S903) is possible without greatly changing control of address generation as a whole. By virtue of the present embodiment, it becomes possible to perform mutual conversion of a block order and a raster order in accordance with simple control with respect to any image size or block size.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-007226 filed on Jan. 18, 2016, which is hereby incorporated by reference herein in its entirety.

What is claimed is:

1. An image processing apparatus comprising:
a controller including one or more circuits or one or more processors, the controller acting as units comprising:
a memory controlling unit configured to write a band of image data in a memory and to read out the band of image data in a block unit from the memory; and
an image processing unit configured to perform an image processing on the image data read in a block unit,
wherein a first band of the image data is written in the memory according to a first memory access pattern, and the first band of the image data is read out from the memory according to a second memory access pattern,
wherein a second band of the image data is written in the memory according to the second memory access pattern, and wherein the second memory access pattern is determined based on a width of the image data and the first memory access pattern.

2. The image processing apparatus according to claim 1, wherein the memory controlling unit is further configured to write a block of image data in the memory and to read out the band of image data from the memory,
- wherein blocks of a third band of the image data are written in the memory according to a third memory access pattern, and the third band of the image data is read out from the memory according to a fourth memory access pattern,
- wherein blocks of a fourth band of the image data are written in the memory according to the fourth memory access pattern, and
- wherein the fourth memory access pattern is determined based on at least a height of the blocks and the third memory access pattern.

3. The image processing apparatus according to claim 1, wherein in a case where, as a result of adding an address increased amount according to the second memory access pattern to an address value of a current processing target address, an address value after the addition exceeds an address depth of the memory, the memory controlling unit subtracts, from the address value after the addition, the address depth of the memory.

4. The image processing apparatus according to claim 1, wherein a width of a block of a band is set as an initial value of an address increased amount of memory access patterns.

5. The image processing apparatus according to claim 1, wherein the units further comprise:
- (1) an address increased amount calculation unit configured to calculate, in a band unit, an address increased amount from a current processing target address that is used for calculating an address next written to or read out from, wherein the calculated address increased amount is applied for each address for a band;
- (2) an address calculation unit configured to calculate an address of a write destination for a time of writing image data to the memory and an address of a readout destination for a time of reading out image data from the memory, by adding an address increased amount calculated by the address increased amount calculation unit to an address value of the current processing target address; and
- (3) an access unit configured to, in accordance with the address calculated by the address calculation unit, access the memory and execute writing and reading out of image data,
- wherein the address calculation unit calculates an address upon receiving an address request from the access unit.

6. The image processing apparatus according to claim 5, wherein the address calculation unit further adds to the calculated address a residue number obtained by dividing a number of times an address request has been received from the access unit by a block width of a block included in an area in the band.

7. The image processing apparatus according to claim 5, wherein the address calculation unit comprises:
- an address holding unit configured to hold an address value of a current processing target address,
- a register configured to hold an address depth of the memory,
- an adder configured to add the address value held by the address holding unit and the address increased amount calculated by the address increased amount calculation unit,
- a subtractor configured to subtract the address depth held by the register from an addition result by the adder,
- a comparator configured to compare the address depth held by the register with an addition result by the adder, and
- a selector configured to select, based on a comparison result of the comparator, one of the addition result by the adder and a subtraction result by the subtractor, and output a selected result to the address holding unit.

8. The image processing apparatus according to claim 7, wherein the address calculation unit for calculating the address of the write destination and the address calculation unit for calculating the address of the readout destination are separately provided.

9. The image processing apparatus according to claim 7, wherein the address increased amount calculation unit comprises:
- a register configured to hold modes for converting image data from a raster order to a block order or converting image data from a block order to a raster order,
- a register configured to hold a block size of a block included in an area in the band,
- a register configured to hold an image width of the region,
- an address increased amount holding unit configured to hold a current address increased amount, and
- a next address increased amount holding unit configured to hold a next address increased amount,
- wherein the address increased amount holding unit, upon receiving an end notification that is notified when processing for each of areas in the band has ended, loads the next address increased amount that is held in the next address increased amount holding unit, and
- wherein the next address increased amount holding unit, uses the mode, the block size, and the image width of the area and, if converting image data from a raster order to a block order, loads, out of the plurality of areas in the band, from the address holding unit as a next address increased amount an address value of an address that is the image width number of addresses from a first address of an area currently being processed, and if converting image data from a block order to a raster order, loads, out of the plurality of areas in the band, from the address holding unit as the next address increased amount an address value of an address that is, from a first address of an area currently being processed, separated by a number of addresses equal to a block size of the block included in the area.

10. The image processing apparatus according to claim 1, wherein the first memory access pattern indicates a first difference value between a first memory address and a second memory address which is to be accessed next to the first memory address,
- wherein the second memory access pattern indicates a second difference value between a third memory address and a fourth memory address which is to be accessed next to the third memory address, and
- wherein the second difference value is different from the first difference value.

11. A method of controlling an image processing apparatus, the method comprising:
- writing a band of image data in a memory and reading out the band of image data in a block unit from the memory; and
- performing an image processing on the image data read in a block unit,
- wherein a first band of the image data is written in the memory according to a first memory access pattern, and the first band of the image data is read out from the memory according to a second memory access pattern, wherein a second band of the image data is written in the memory according to the second memory access pattern, and wherein the second memory access pattern is determined based on a width of the image data and the first memory access pattern.

12. A non-transitory computer-readable storage medium storing a computer program for causing a computer to execute a method of controlling an image processing apparatus, the method comprising:

writing a band of image data in a memory and reading out the band of image data in a block unit from the memory; and performing an image processing on the image data read in a block unit;

wherein a first band of the image data is written in the memory according to a first memory access pattern, and the first band of the image data is read out from the memory according to a second memory access pattern, wherein a second band of the image data is written in the memory according to the second memory access pattern, and wherein the second memory access pattern is determined based on a width of the image data and the first memory access pattern.

* * * * *